H. JOHNSON & A. C. HOLLINGWORTH.
EGG CANDLER.
APPLICATION FILED MAR. 24, 1914.

1,141,062.

Patented May 25, 1915.
2 SHEETS—SHEET 1.

Witnesses

Henry Johnson and
Alfred C. Hollingworth, Inventors by

Attorneys

H. JOHNSON & A. C. HOLLINGWORTH.
EGG CANDLER.
APPLICATION FILED MAR. 24, 1914.
1,141,062.
Patented May 25, 1915.
2 SHEETS—SHEET 2.
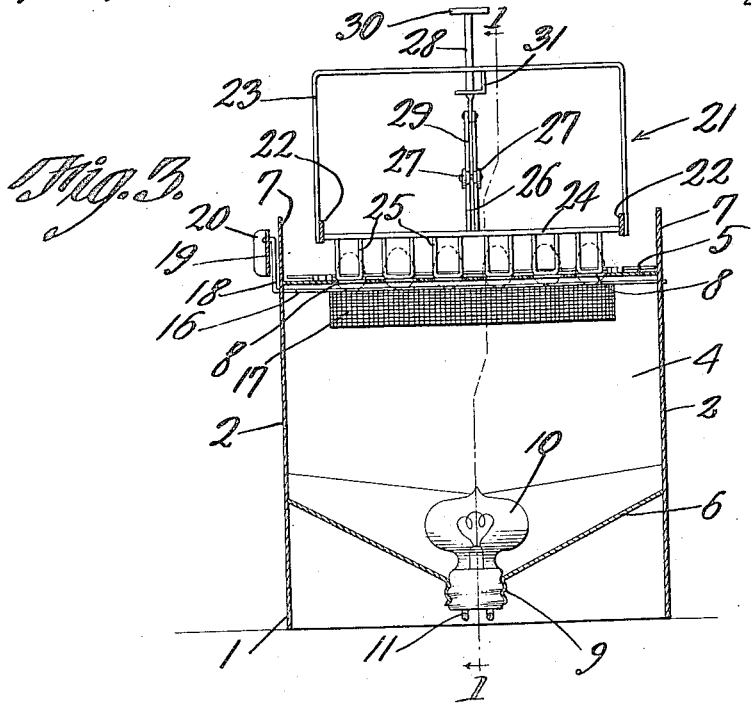
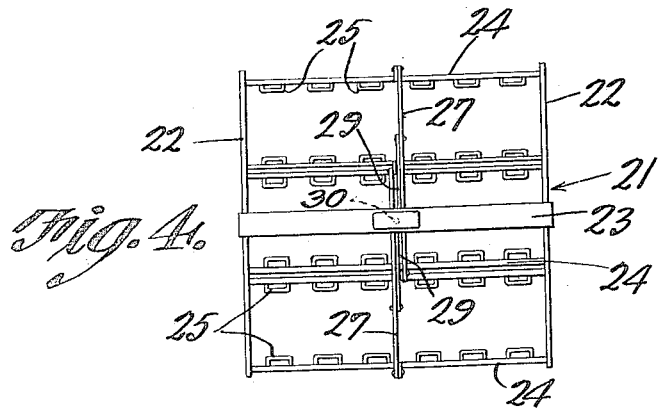
Witnesses
Henry Johnson and
Alfred C. Hollingworth, Inventors
by Attorneys

UNITED STATES PATENT OFFICE.

HENRY JOHNSON AND ALFRED C. HOLLINGWORTH, OF BEATRICE, NEBRASKA; SAID JOHNSON ASSIGNOR TO MASON O. GOBLE, OF BEATRICE, NEBRASKA.

EGG-CANDLER.

1,141,062. Specification of Letters Patent. Patented May 25, 1915.

Application filed March 24, 1914. Serial No. 826,957.

*To all whom it may concern:*

Be it known that we, HENRY JOHNSON and ALFRED C. HOLLINGWORTH, citizens of the United States, residing at Beatrice, in the county of Gage and State of Nebraska, have invented a new and useful Egg-Candler, of which the following is a specification.

The present invention appertains to egg candlers or testers and aims to provide a novel and improved appliance of that character.

The present invention contemplates the provision of a candler having an apertured egg holding plate or member, in connection with unique egg lifting means therebelow, for lifting or raising the ends of the eggs upwardly from the apertures, in order that the eggs may be readily and properly engaged by the handler.

The present invention has for another object to provide in connection with the egg lifting means, means for actuating the same in a simple and convenient manner, the lifting means being arranged to swing out of the way of the egg apertures in such a way as not to obstruct the same during the testing or candling of the eggs.

It is also within the scope of the present invention to provide a candler of generally improved construction, whereby the utility thereof will be enhanced, and whereby the candler will be of comparatively simple and inexpensive construction, as well as being simple, convenient, serviceable, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1:
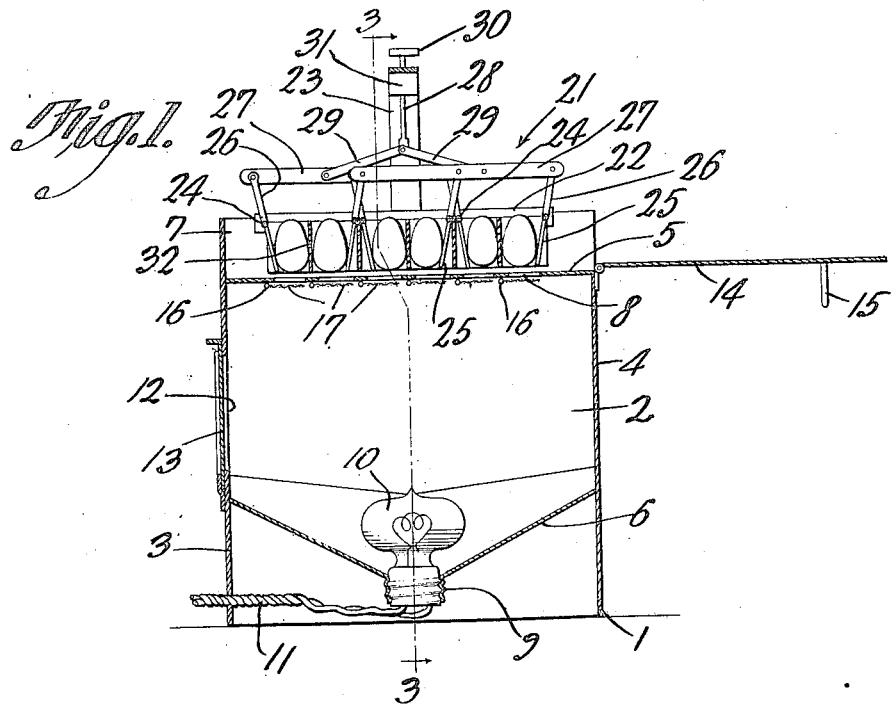
Figure 2:
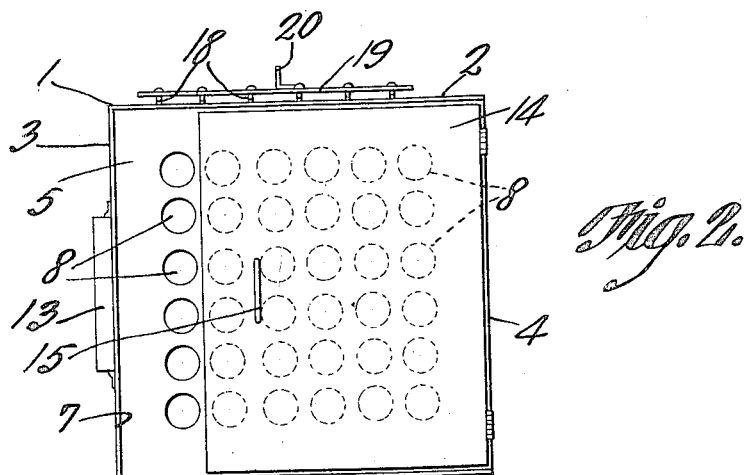

Figure 1 is a vertical section of the device, illustrating the handler applied to the eggs, and illustrating the egg lifting means in raised condition to lift the eggs so that they may be readily engaged by the handler, the section being taken on the line 1—1 of Fig. 3. Fig. 2 is a plan view of the candler in condition for testing a small number of eggs. Fig. 3 is a vertical section, taken on the line 3—3 of Fig. 1, illustrating the eggs seated within the apertures of the holder, and illustrating the lifting means lowered to inoperative or inactive condition. Fig. 4 is a plan view of the handler.

The candler or tester embodies an upright case 1, of square or rectangular outline, and which is preferably constructed of sheet metal, although not necessarily so. The case 1 embodies the sides 2, the front 3, the back 4, the top 5 and the bottom 6. The sides 2 and front 3 are raised above the top 5, to provide the side and front flanges 7, for preventing the eggs from rolling off of the top plate 5.

The top plate 5 is provided with a plurality of apertures or openings 8, preferably six rows of apertures, with six apertures in a row, according to the arrangement of a layer or rack of eggs within an ordinary egg crate. The apertures 8 are of such a size, as to receive the ends of the eggs, without permitting the eggs to pass completely through the apertures, and whereby the eggs may be readily seated within the apertures for candling or testing the same.

As will be obvious, the top plate or egg holder 5, as well as the walls of the case, are opaque, the inner faces of the walls being preferably polished to increase the reflection of the light within the case. The bottom 6 of the case, which is raised above the lower edges of the walls, is dished or funnel-shaped, so that the bottom 6 is inclined from its central portion to its margin, the upper surface of the bottom 6 being preferably polished to increase the reflection of light therefrom.

In order to illuminate the interior of the case, the central or lower portion of the bottom 6 is provided with an opening or socket 9 for the reception of the plug of an incandescent electric lamp 10, the conductors 11 of the lamp 10 being preferably passed through the lower portion of the front wall 3 of the case, for connection in an electric circuit. It will be apparent, of course, that any suitable source of illumination may be disposed within the case, but the electric lamp is preferable. When the lamp 10 is lighted, the rays of light will be directed upwardly, either direct from the lamp 10 or from the bottom or reflector 6 and the walls of the case by reflection. Thus, the lamp rays are directed upwardly against the bottom of the top plate or egg holder 5.

The front wall 3 of the case is provided with an opening 12 which permits access to be had into the interior of the case, either for inserting or removing the lamp, or the like. The opening 12 is normally closed by means of a vertically sliding door 13 suitably mounted upon the outer face of the front wall 3.

A cover or closure plate 14 is hinged to the upper end of the back wall 4 of the case so as to swing snugly or flatly over the top plate 5 between the upstanding side flanges 7. The cover or shutter 14 is of such a length from its hinged to its free end, as to close the majority of apertures 8 when the shutter 14 is swung over the top 5, thereby leaving only a small number, preferably a single row, of the apertures 8 exposed or open. In this manner, when the cover 14 is swung over the top 5, the front row of apertures 8 will be exposed, which will enable small numbers of eggs to be candled or tested, the light being prevented from escaping through the apertures in rear of the front row, due to the fact that the opaque cover 14 closes the same. When the cover 14 is swung rearwardly, all of the apertures 8 will be opened, to enable a large quantity of eggs to be candled or tested simultaneously. The cover 14 is provided with a suitable handle 15 for facilitating the opening and closing thereof.

The egg lifting means embodies a plurality of shafts or rods 16 journaled through the sides 2 of the case directly under the top plate 5, and between or at the sides of the transverse rows of apertures 8. To each of the shafts or rods 16 is secured or attached a wing or lifter 17, of meshed wire or reticulated material, or the like. The wings or vanes 17 are preferably slightly flexible or yieldable, to reduce the liability of injuring the eggs when the lifting means is brought into operation. The wings or lifters 17 are arranged to be swung under the respective rows of apertures 8, by properly oscillating the shafts or rods 16. By means of the shafts or rods 16, the lifters 17 are pivoted underneath the top plate or egg holder 5, between or at the side of the respective rows of apertures, in order that the lifters will not obstruct the said openings, when they are swung downwardly to depending positions. In order to actuate the lifters 17 simultaneously, the shafts or rods 16 are provided at one end with cranks 18 adjacent the outer face of one side 2 of the case, and an actuating strip or link 19 connects the several cranks 18, and is provided with an outer finger piece 20, whereby when the strip or link 19 is moved in opposite directions, the cranks 18 will be oscillated to oscillate the lifters or wings 17 properly.

The egg handler which has been designated generally by the numeral 21, embodies a frame including side members or bars 22 connected at intermediate portions by a bail 23. Two sets of rods or shafts 24 are terminally journaled through the side bars 22, and are arranged in pairs. A series of wire or flexible loops 25 is attached to each shaft or rod 24, and the loops depend therefrom, to engage the eggs, as will hereinafter more fully appear. The depending loops 25 of the coöperating or companion shafts or rods 24 coöperate to receive therebetween, two rows of eggs, as seen in Fig. 1.

In order to enable the egg grasping loops or fingers 25 of each pair of shafts 24 to be swung to and from each other, the shafts 24 of each set are provided with upstanding arms 26, to the upper or free ends of which is pivoted a bar or link 27. A plunger 28 is slidable through the intermediate portion or crest of the bail 23, and links 29 connect the lower end of the plunger 28 and the bars 27 whereby when the plunger 28 is raised and lowered, the bars 27 may be moved longitudinally relative to each other, to actuate the shafts 24. Thus, when the plunger 28 is raised, the loops or fingers 25 of each pair, will be swung apart, and when the plunger 28 is depressed, the loops or fingers 25 will be swung toward each other, as seen in Fig. 1, to engage the opposite sides of the double rows of eggs.

The plunger 28 is provided at its upper end with a finger piece or handle 30, for convenience in actuating the plunger, and an angular guide 31 is secured to the bottom of the intermediate or yoke portion of the bail 23, to properly guide the plunger 28 for vertical reciprocation.

The handler 21 is designed for carrying a layer of eggs from an ordinary egg crate, and to this end, the depending loops or fingers 25 are insertible, when swung apart, within the ordinary cellular egg rack or filler 32, whereby the loops 25 may engage the opposite sides of the double rows of eggs, as seen in Fig. 1. Thus, by pressing the plunger 28, the loops 25 of each set or pair may be swung toward each other, to cause the lower ends of the loops 25 to swing under the bulged portions of the eggs. In this manner, the respective rows of eggs are pressed against the partitions of the rack 32 or therebetween, and when the layer of eggs is lifted, the rack 32 will be lifted therewith. When the layer or rack of eggs is set upon the candler, or back into the egg crate, the handler 21 may be readily withdrawn from the rack, by sliding the plunger 28 upwardly, so as to release the eggs, and to permit the loops or fingers 25 to be withdrawn from the egg rack 32 without difficulty.

When the present apparatus is employed for testing a crate of eggs, the several or successive layers or rack of eggs may be removed from the crate, one at a time, and may be applied upon the egg holder 5 of the candler. It is thus an easy matter for the operator to remove a layer or rack of eggs from the crate, and then place the same upon the top plate or egg holder 5, in order that the eggs may drop and seat within the apertures 8. Then, by removing the handler 21; and lighting the lamp 10, the eggs may be readily candled or tested, to detect unfertile or stale eggs, so that the same may be removed, and replaced by fresh or fertile ones. After the candling or testing operation, the handler 21 may again be applied to the eggs, as seen in Fig. 1, this being readily accomplished by swinging the wings or lifters 17 upwardly under the apertures or openings 8 and against the holder 5, which will cause the eggs to be lifted or raised upwardly out of the apertures 8, in order that the eggs may be properly or effectively engaged by the handler 21. When the lifters 17 are inoperative or inactive, they depend between the rows or apertures 8, so as not to encumber or obstruct the apertures, from below, as would be objectionable. After the eggs have been engaged or grasped by the handler 21, the lifters 17 are again swung downwardly to normal or active positions, and the eggs may be replaced in the crates, as will be obvious.

When small numbers of eggs are to be candled or tested, without the use of the handler 21, the cover 14 is swung over the egg holder 5, to close the majority of the apertures 8, whereby the eggs may be placed within the exposed row of apertures 8. In this manner, small numbers of eggs may be readily tested, without the light passing through the unused portion of the apertures 8, as would be objectionable.

From the foregoing, taken in connection with the drawing, the salient features and various capabilities of the present apparatus will be obvious to those versed in the art, without further comment being necessary, it being noted that the objects aimed at had been carried out satisfactorily by the provision of the structure herein disclosed.

Having thus described the invention, what is claimed as new is:—

1. In an egg candler, a case having an upper apertured egg holder, shafts journaled through the sides of the case between the respective apertures below the holder, vanes attached to the shafts, and actuating means connected with the shafts at one end, for simultaneously oscillating the same.

2. In an egg candler, a casing having an upper apertured egg holder, shafts journaled through the sides of the case between the respective apertures below the holder, vanes attached to the shafts, the shafts having cranks at one end, and an actuating bar connecting the said cranks.

In testimony that we claim the foregoing as our own, we have hereto affixed our signatures in the presence of two witnesses.

HENRY JOHNSON.
ALFRED C. HOLLINGWORTH.

Witnesses:
H. E. SACHETT,
CHAS. L. BREWSTER.

Copies of this patent may be obtained for five cents each, by addressing the "Commissioner of Patents, Washington, D. C."